(12) United States Patent
Loyens et al.

(10) Patent No.: US 11,631,049 B1
(45) Date of Patent: *Apr. 18, 2023

(54) MULTIPLE DATA SOURCE PRODUCT INVENTORY, DISPOSITION, AND ORDER MANAGEMENT SYSTEM

(71) Applicant: Versata Development Group, Inc., Austin, TX (US)

(72) Inventors: Jon Loyens, Austin, TX (US); David R. Middleton, Austin, TX (US); Rahul Subramaniam, Dubai (AE); Aditya P. Kulkarni, Bangalore (IN); Asif Ahmed Sheikh, New York, NY (US)

(73) Assignee: Versata Development Group, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/809,033

(22) Filed: Mar. 4, 2020

Related U.S. Application Data

(63) Continuation of application No. 16/194,936, filed on Nov. 19, 2018, now Pat. No. 10,621,547, which is a
(Continued)

(51) Int. Cl.
*G06Q 10/00* (2012.01)
*G06Q 10/08* (2012.01)
(Continued)

(52) U.S. Cl.
CPC ........ *G06Q 10/087* (2013.01); *G06Q 10/10* (2013.01); *G06Q 30/02* (2013.01)

(58) Field of Classification Search
CPC ....... G06Q 10/087; G06Q 10/10; G06Q 30/02
See application file for complete search history.

(56) References Cited

U.S. PATENT DOCUMENTS

| 6,415,266 B1 * | 7/2002 | Do ..................... G06Q 10/087 |
| | | 700/214 |
| 8,781,882 B1 * | 7/2014 | Arboletti ........... G06Q 10/0639 |
| | | 705/7.41 |

(Continued)

OTHER PUBLICATIONS

Notice of Allowance dated Feb. 5, 2020, filed in U.S. Appl. No. 16/194,936, pp. 1-8.
(Continued)

*Primary Examiner* — Talia F Crawley

(57) ABSTRACT

An inventory, disposition, and order management system and method utilizes multiple data sources to obtain complementary and augmented product data to determine an enhanced set of product data that reflects product inventory and disposition history information in a supply chain. The system and method can utilize the complementary and augmented product data to formulate recommended orders to achieve product dealer sales goals. The system and method compare the product data obtained from the data sources and reconcile any discrepancies. In at least one embodiment, the product data includes product identification data, product inventory data, product configuration data, and product disposition history data. Obtaining data from multiple sources allows the system and method to develop more accurate and complete data through an audit and reconciliation process as opposed to data obtained from a single source.

13 Claims, 6 Drawing Sheets

Related U.S. Application Data continuation of application No. 12/021,583, filed on Jan. 29, 2008, now Pat. No. 10,134,003.

(60) Provisional application No. 60/888,054, filed on Feb. 2, 2007.

(51) Int. Cl.
  *G06Q 10/087* (2023.01)
  *G06Q 30/02* (2012.01)
  *G06Q 10/10* (2012.01)

(56) References Cited

U.S. PATENT DOCUMENTS

| | | | | |
|---|---|---|---|---|
| 10,134,003 B1* | 11/2018 | Loyens | ............... | G06Q 10/087 |
| 2004/0181310 A1* | 9/2004 | Stashluk, Jr. | .......... | G06Q 30/00 |
| | | | | 700/226 |
| 2004/0193438 A1* | 9/2004 | Stashluk, Jr. | .......... | G06Q 30/02 |
| | | | | 705/304 |
| 2004/0194056 A1* | 9/2004 | Combs | ................ | G06Q 30/016 |
| | | | | 717/104 |
| 2005/0060226 A1* | 3/2005 | Heithoff | ................ | G06Q 30/02 |
| | | | | 705/14.24 |
| 2010/0138264 A1* | 6/2010 | Faris | ...................... | G06Q 10/10 |
| | | | | 707/769 |
| 2011/0266345 A1* | 11/2011 | Fowler | .................. | H05B 47/19 |
| | | | | 235/492 |
| 2020/0074257 A1* | 3/2020 | Leitermann | ........ | G06K 19/0724 |
| 2020/0161742 A1* | 5/2020 | Leitermann | ............ | G16H 40/20 |

OTHER PUBLICATIONS

Notice of Allowance dated Dec. 4, 2019, filed in U.S. Appl. No. 16/194,936, pp. 1-8.

Terminal Disclaimer dated Nov. 13, 2019, filed in U.S. Appl. No. 16/194,936, pp. 1-3.

Response to Non-Final Office Action dated Nov. 12, 2019, filed in U.S. Appl. No. 16/194,936, pp. 1-5.

Non-Final Rejection dated Jul. 11, 2019, filed in U.S. Appl. No. 16/194,936, pp. 1-5.

* cited by examiner

MULTIPLE DATA SOURCE PRODUCT INVENTORY, DISPOSITION, AND ORDER MANAGEMENT SYSTEM

CROSS-REFERENCE TO RELATED APPLICATION

This application claims the benefit under 35 U.S.C. § 119(e) and 37 C.F.R. § 1.78 of U.S. Provisional Application No. 60/888,054, filed Feb. 2, 2007, entitled "Multiple Data Source Product Inventory, Disposition, And Order Management System," which is incorporated by reference in its entirety.

BACKGROUND OF THE INVENTION

Field of the Invention

The present invention relates in general to the field of information processing, and more specifically to a system and method for determining product inventory and product disposition and providing order management using multiple data sources.

Description of the Related Art

Referring to FIG. 1, a dealer-to-original equipment manufacturer (OEM) order entry system 100 depicts the placement of orders by product dealers or third parties acting on behalf of one or more product dealers. Dealers have data available that indicates sales, trade, or lease (collectively referred to as "sales") histories of products together with sales revenue. For example, the dealer generally has data that indicates when a product arrived in the dealer's inventory, when the product was sold or perhaps traded to another dealer, the average selling time, and days supply. Some dealers also have limited product description data available. For example, an automotive dealer may have year, make, model, and trim of a vehicle that was sold or is currently in inventory.

Product dealers or third parties acting on behalf of one or more product dealers periodically generate orders for products based on an analysis of supply and demand. Based on product history and product description, the dealer or a third party acting on behalf of the dealer uses experience to place an order 102 for products.

Order 102 is generally entered into a dealer or third party computerized order entry system 104. The orders 102 are, for example, electronic data files that can be sent via a network, such as the Internet, or via other delivery methods to an OEM system 106. The OEM system 106 interprets the order, and the OEM ultimately determines whether the order can be completely fulfilled as requested or with substitute products or partially fulfilled.

Generally a dealer has particular sales goals, and the dealer intends for the order 102 to allow the dealer to fulfill the sales goals. Sales goals can vary from dealer to dealer and vary over time. For example, a dealer may want to maximize profitability, or a dealer may want to maximize sales volume. However, the data available to the dealer often prevents the dealer from optimizing the order 102 to increase a probability of achieving the dealer's sales goals. For example, certain configuration features or a combination of configuration features of a product can cause some products to sell better than others or better meet other sales goals, such as profitability. However, dealers often do not have a database of configuration data that provides data on features and attributes of features.

A configurable product, such as a vehicle, is configured with a variety of features that together define the product. For an automobile, features can include, for example, trim, option packages, wheels, audio components, transmission, engine, roof, interior color, interior fabric, exterior color, etc. Each feature has a particular attribute selected from a group of attributes, such as V8 engine, red exterior color, 16 inch alloy wheels, etc. Product configuration data generally resides with the OEM. Given the large number of possible configurations, it is difficult for the dealer to accurately determine why a product is selling. For example, a dealer may believe that red cars sell better than blue cars. However, red cars with Feature 1, Attribute A, Feature 2, Attribute C, . . . , and Feature Y, Attribute B may be better selling than cars with Feature 1, Attribute B, Feature 2, Attribute D, . . . , and Feature Y, Attribute B. Detailed configuration data corresponding to past and current inventory can allow the dealer to take into consideration attribute values of configurable features when placing an order.

OEM's generally have complete product configuration data, i.e. data indicating the features available on a product and the attribute values of the features. OEMs also generally have product order status data that indicates a history and/or current status of a product from an initial order until the product leaves the OEM. In other words, the OEM has manufacturing pipeline data. However, OEM's generally do not have product disposition data at the dealer level basis once the product leaves the OEM.

Dealer and OEM product disposition history can be contradictory. For example, a product may have been delivered to a dealer and, thus, appears as inventory in the dealer's product disposition history data. However, in the OEM product disposition history data, the same product may appear as a product in the OEM's pipeline. The discrepancies can occur, for example, when the OEM data is not up-to-date.

The values of particular product attributes and accurate, complete status and product disposition history data influences dealer sales and the achievement of dealer sales goals. Determining an order based on incomplete product configuration data and partial product disposition history can negatively impact the ability of a dealer to meet sales goals or to attain higher than otherwise expected sales goals.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An inventory, disposition, and order management system and method utilizes multiple data sources to obtain complementary and augmented product data to determine an enhanced set of product data that reflects product inventory and disposition history information in a supply chain. The system and method can utilize the complementary and augmented product data to formulate recommended orders to achieve product dealer sales goals. The system and method compare the product data obtained from the data sources and reconcile any discrepancies. The product data may include data for a plurality of products in a supply chain and for a plurality of suppliers, such as original equipment manufacturers (OEMs). In at least one embodiment, the product data includes product identification data, product inventory data, product configuration data, and product disposition history data. Obtaining data from multiple sources allows the system and method to develop more accurate and complete data through an audit and reconciliation process as opposed to data obtained from a single source.

In at least one embodiment, the data sources complement each other by providing additional data about a product and augment each other by providing more detailed data associated with a product. For example, in at least one embodiment at least one data source includes product configuration data that indicates more extensive information than other data sources about features and attributes of products in current inventory, previously in inventory within a predefined period of time, or in an original equipment manufacturer (OEM) pipeline. In at least one embodiment, another data source provides more data regarding the disposition history of a product. In at least one embodiment, one of the data sources is a dealer management system and another is an original equipment manufacturer (OEM) system. Consolidating the complementary and augmenting data sources and reconciling any data discrepancies provides a reconciled, combined product status disposition history and detailed product configuration, which allows the system and method to process more complete and accurate data and, thus, improve the recommended order.

Figure 1:
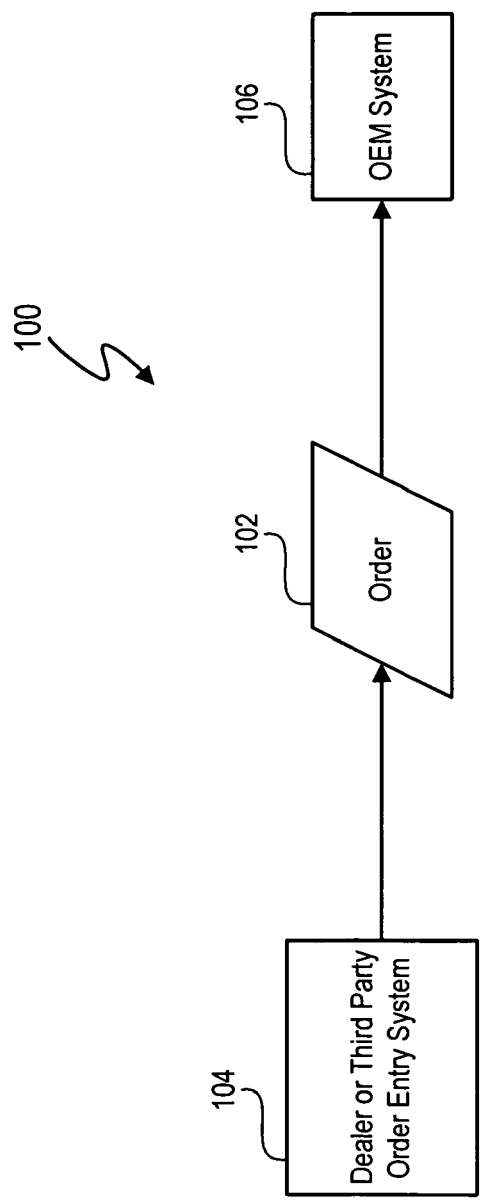
FIG. 1 (labeled prior art) depicts a dealer-to-original equipment manufacturer order entry system.
Figure 2:
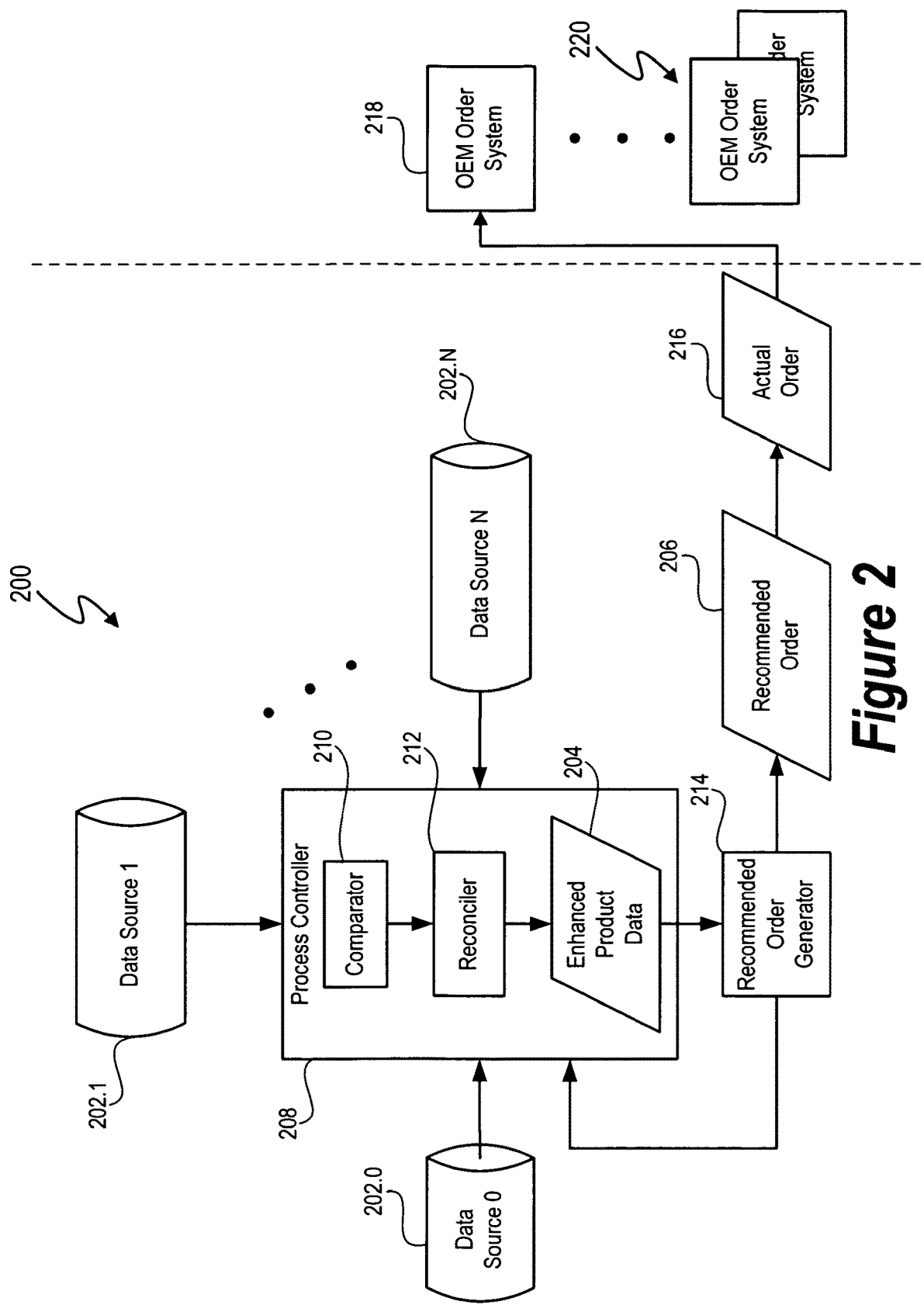
FIG. 2 depicts an inventory, disposition, and order management system.

FIG. 2 depicts inventory, disposition, and order management system 200, which is one embodiment of an inventory, disposition, and order management system.

The inventory, disposition, and order management system 200 utilizes data complementary and augmenting data from multiple data sources 202.0, 202.1, . . . , 202.N to develop enhanced product data 204 that accurately depicts an inventory of products and disposition of products. "N" is an integer greater than one, and the particular value of N is a matter of design choice. In at least one embodiment, N is chosen based on the availability of complementary and augmenting data sources and any other data sources useful in determining a recommended order 206 for products.

The multiple data sources 202.0, 202.1, . . . , 202.N utilized by inventory, disposition, and order management system 200 can be any distinct set of data sources. The distinct data sources have different data; however, the data can be overlapping. For example, the data sources may all identify a product by the same identifier and also have different data about the product. Preferably, the sets of data from the respective data sources include complementary data that fills in data gaps within respective sets of data and augmenting data that provides additional details related to a common data item. In at least one embodiment, the data sources 202.0, 202.1, . . . , 202.N are remotely located from each other in separate databases connected through a data network, such as the Internet. In at least one embodiment, at least two of the data sources are physically co-located. In any event, the data sources 202.0, 202.1, . . . , 202.N include distinct data related to a product and collected from respective sources. The data sources can be physically arranged in any of a variety of ways and locations.

Figure 3:
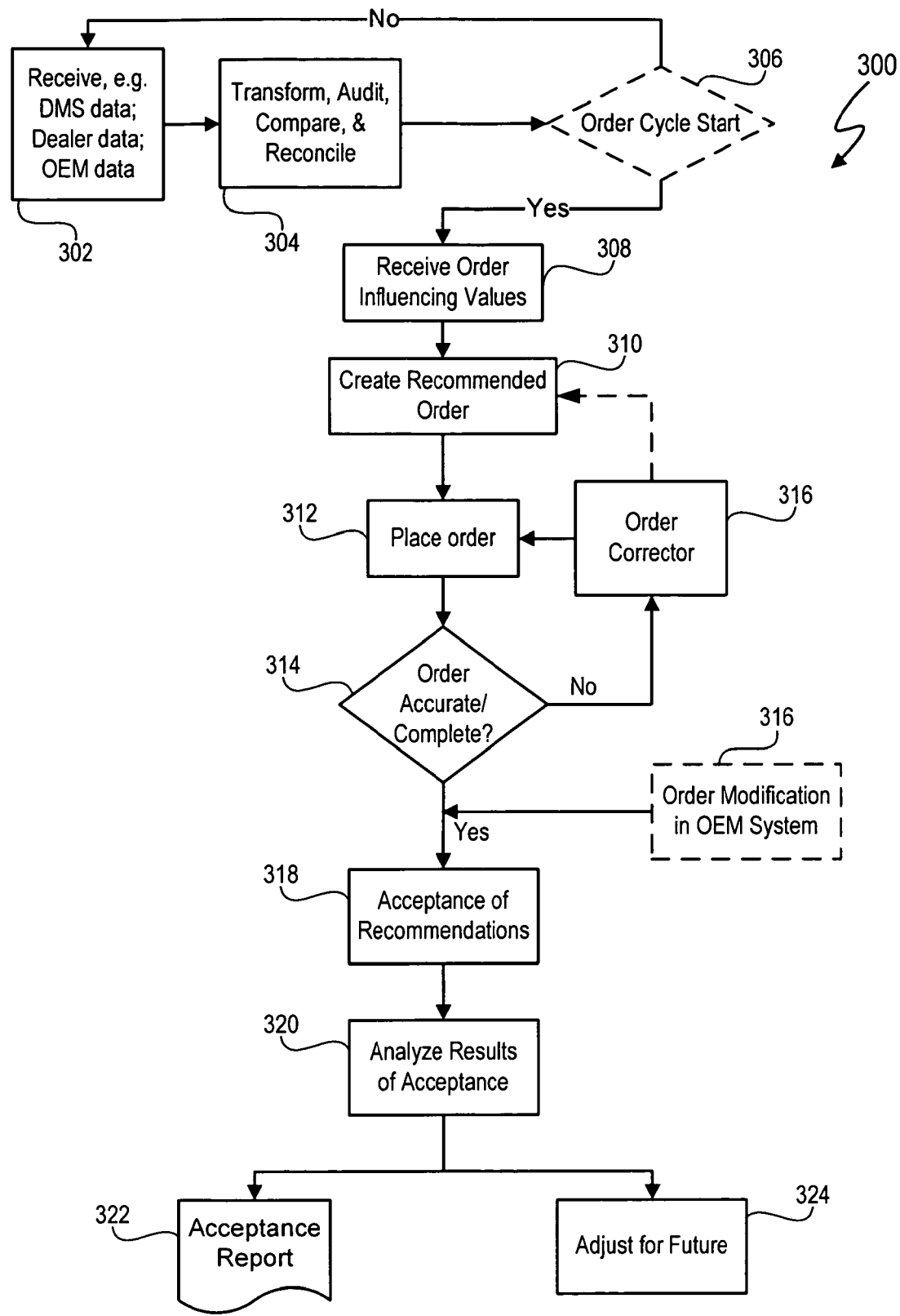
FIG. 3 depicts an inventory, disposition, and order management process.

FIG. 3 depicts inventory, disposition, and order management process 300. The inventory, disposition, and order management system 200 includes a process controller 208 that, in at least one embodiment, operates in accordance with inventory, disposition, and order management process 300 to determine enhanced product data 204. Operation 302 receives data from the data sources 202.0, 202.1, . . . , 202.N. As described in more detail below, example data sources in an automotive context are dealer management, dealer, and OEM data sources. The data received from data sources 202.0, 202.1, . . . , 202.N may not be in a desired form for processing by process controller 208. For example, it may be desirable to place the data into a single database, apply predetermined formats, apply the data into predefined records, and so on. Thus, operation 304 preferably transforms the data received from data sources 202.0, 202.1, . . . , 202.N into a desired form. Additionally, operation 304 can perform an audit of the data by reviewing the data against pre-determined audit rules and making a determination as to whether the data is valid or not. For example, operation 304 can audit data from data sources 202.0, 202.1, . . . , 202.N using rules that define expected values for certain types of data. Example audit rules in an automotive dealership context are set forth in Table 1. The audit rules can be tailored to the type of data field to reflect the type of expected value. Data that does not pass the audit can be processed in any desired manner such as discarding the data or flagging the data for automatic or manual review.

TABLE 1

| DATA FIELD | EXPECTED VALUE |
| --- | --- |
| Dealer Code | 5 character numeric string |
| Vehicle State | not null |
| Receive Date | Valid date in the past & valid data ranges |
| Sale Date | Valid Date after Receive Date |
| Cost Price | greater than or equal to a predetermined monetary value, which could be make and/or model dependent |
| Sale Price | greater than or equal to a predetermined monetary value, which could be make and/or model dependent |
| Inventory Age | greater than 0 |

Process controller 208 includes a comparator 210 and reconciler 212 that assist with the performance of operation 304. Operation 304 also compares the data received from data sources 202.0, 202.1, . . . , 202.N. In at least one embodiment, the comparison of data from data sources 202.0, 202.1, . . . , 202.N detects inconsistencies or other discrepancies in the collective data. For example, data from data source 1 could indicate a product Receive Date of Jan. 10, 2007 and data source 2 could indicate that the product is in an OEM pipeline on Jan. 10, 2007. Operation 304 can include rules that automatically reconcile the received data to resolve discrepancies and/or flag discrepancies for manual review. Once operation 304 compares and reconciles the data, the data is consolidated.

The consolidated data represents enhanced product data relative to data received from any one of data sources 202.0, 202.1, . . . , 202.N. In at least one embodiment, the enhanced product data 204 represents enhanced product inventory information. For example, an automotive dealer management system may have data that identifies vehicles and sales related data. However, the OEM of the dealer may have data that augments the identity of the vehicle by providing more detailed vehicle configuration information and complements the dealer data by providing OEM pipeline information on vehicles previously ordered by the dealer. Additionally, a dealer may have specific preferences, such as sales goals that further enhance the consolidated data in preparation for determining a recommended order 206.

Upon completion of operations 302 and 304 the reconciled data is ready to be processed by process controller 208 into a recommended order 206. However, entities generally have fixed order cycles that determine predetermined times (e.g. the $15^{th}$ of each month) or time intervals (e.g. every 2 weeks), including any exceptions to general predetermined times, to submit an order to an OEM. If entities adhere to an order cycle, operation 306 determines whether an order cycle has started. If not, inventory, disposition, and order management process 300 continues to receive and process data in accordance with operations 302 and 304, respectively. Once an order cycle starts, operation 308 receives order influencing values that influence the recommended order 206. The influencing values can include "orderee" (i.e. the user placing the order) preferences for products, sales goals, and other values that can influence the recommended order 206 and assist inventory, disposition, and order management process 300 in determining a recommended order 206 that conforms to the desires of the orderee.

The inventory, disposition, and order management process 300 also includes a recommended order generator 214. Recommended order generator 214 performs operation 310. Operation 310 processes the enhanced product data 204 into recommended order 206. The recommended order 310 is preferably optimized in view of, for example, the accurate inventory data, user preferences, and user sales goals. The specific recommended order generator 214 and operation 310 are a matter of design choice. In at least one embodiment, the recommended order generator 214 and operation 310 generate recommended orders in accordance with the example systems and methods set forth in U.S. Provisional Patent Application No. 60/700,109, filed Jul. 18, 2005 and U.S. patent application Ser. No. 11/216,607, filed Aug. 31, 2005, and both entitled "Determining Recommended Orders for Configurable Products on a Multi-Dimensional Basis." Both Provisional Patent Application No. 60/700,109 and U.S. patent application Ser. No. 11/216,607 are hereby incorporated by reference in their entireties.

In at least one embodiment, operation 310 takes into consideration the data represented in the enhanced product history together with orderee preferences to generate a recommended order 206 optimized to meet the preferences of the orderee and meet the ordering requirements of the OEM.

Once operation 310 generates recommended order 206, operation places an actual order 216 with an OEM. The actual order 216 can be identical to the recommended order 206, or operation 310 can allow a user access to the recommended order 206 and allow the user to modify the actual order 216. Operation 310 can allow full or limited modifications to the recommended order 206. The recommended order 206 can be presented as electronic data to the user via a user interface of a computer system. In at least one embodiment, operation 312 places the actual order 216 with the OEM by electronically transmitting the electronic order 216 to OEM order system 218.

In at least one embodiment, the data received from data sources 202.0, 202.1, . . . , 202.N represents data for products supplied by multiple OEMs. In this embodiment, inventory, disposition, and order management process 300 develops a recommended order 206 and an actual order 216 for each OEM either concurrently or consecutively. If developed concurrently, operation 312 parses the recommended order 206 into an actual order for each OEM. Operation 312 can also transform each actual order 216 into a format utilized by respective OEM order system. Thus, inventory, disposition, and order management process 300 can develop actual orders for multiple OEMs and transmit the actual orders to OEM order systems 218 and 220.

Operation determines whether the actual order 216 is accurate and complete. In at least one embodiment, accurate and complete information contains product information that is accurate, e.g. all configuration feature attributes are available for manufacture, and complete, e.g. all information needed to place an order is submitted. In at least one embodiment, operation 314 determines than an actual order 216 is accurate and complete if the actual order 216 is not rejected by the recipient OEM. An OEM can reject the actual order by, for example, sending a rejection message to inventory, disposition, and order management process 300.

If operation 314 determines than an order is not be accurate, operation 316 analyzes the reasons for rejection and, if possible, corrects the order and causes operation 310 to resubmit the corrected actual order 216 to OEM order system 218. For example, if a typographical error or other clerical-type error caused the actual order 216 to be rejected, there is not need to re-run operation 310. Under certain circumstances, operation 316 returns inventory, disposition, and order management process 300 to operation 310, and operation 310 determines a new recommended order 206. For example, a new recommended order 206 is preferably generated if the rejection by the OEM causes a new selection (including a change of feature attributes of one or more products) of products in the actual order 216 is rejected by the OEM. For example, an OEM may modify a particular selection of products if the OEM discontinues the products entirely or as configured in the actual order 216, if the orderee exceeds the OEM's product allocation to the orderee, and so on. Operation 310 takes into consideration the reasons for the previous rejection of actual order 216 so that actual order 216 will not be rejected again for the same reason(s).

Once an actual order 216 is submitted to an OEM order system 218 and operation 314 determines that the actual order 216 is accurate and complete, operation 316 still allows an orderee, such as a dealer, to optionally modify the order within the OEM order system 218.

To improve future performance and evaluate current performance, inventory, disposition, and order management process 300 includes an analysis and feedback mechanism. Operation 318 compares the actual order 216 with the recommended order 206 and notes similarities and/or dissimilarities. In at least one embodiment, less dissimilarity indicates a successful recommended order 206, at least from a formulation and generation standpoint. Future sales statistics and other evaluation metrics can be generated to determine if orderee sales goals were met. Although many variable can affect meeting sales goals, such evaluation metrics can also be useful in evaluating past recommended orders and improving future recommended orders.

Operation 320 analyzes past actual orders and corresponding recommended orders to further search for data that could lead to improvement of inventory, disposition, and order management process 300. For example, operation 320 can search for data trends of differences between an actual order and a corresponding recommended order. For example, if actual orders always have approx. 5% more red cars than the corresponding recommended orders, a trend has been identified that can be used to adjust future recommended orders.

Operation 320 generates an acceptance report 322 that provides the results of operations 318 and 320. Operation 324 utilizes the results of operations 318 and 320 to adjust operations in inventory, disposition, and order management process 300 so that future recommended orders more closely match corresponding actual orders. The inventory, disposition, and order management process 300 repeats for each order cycle.

Figure 4:
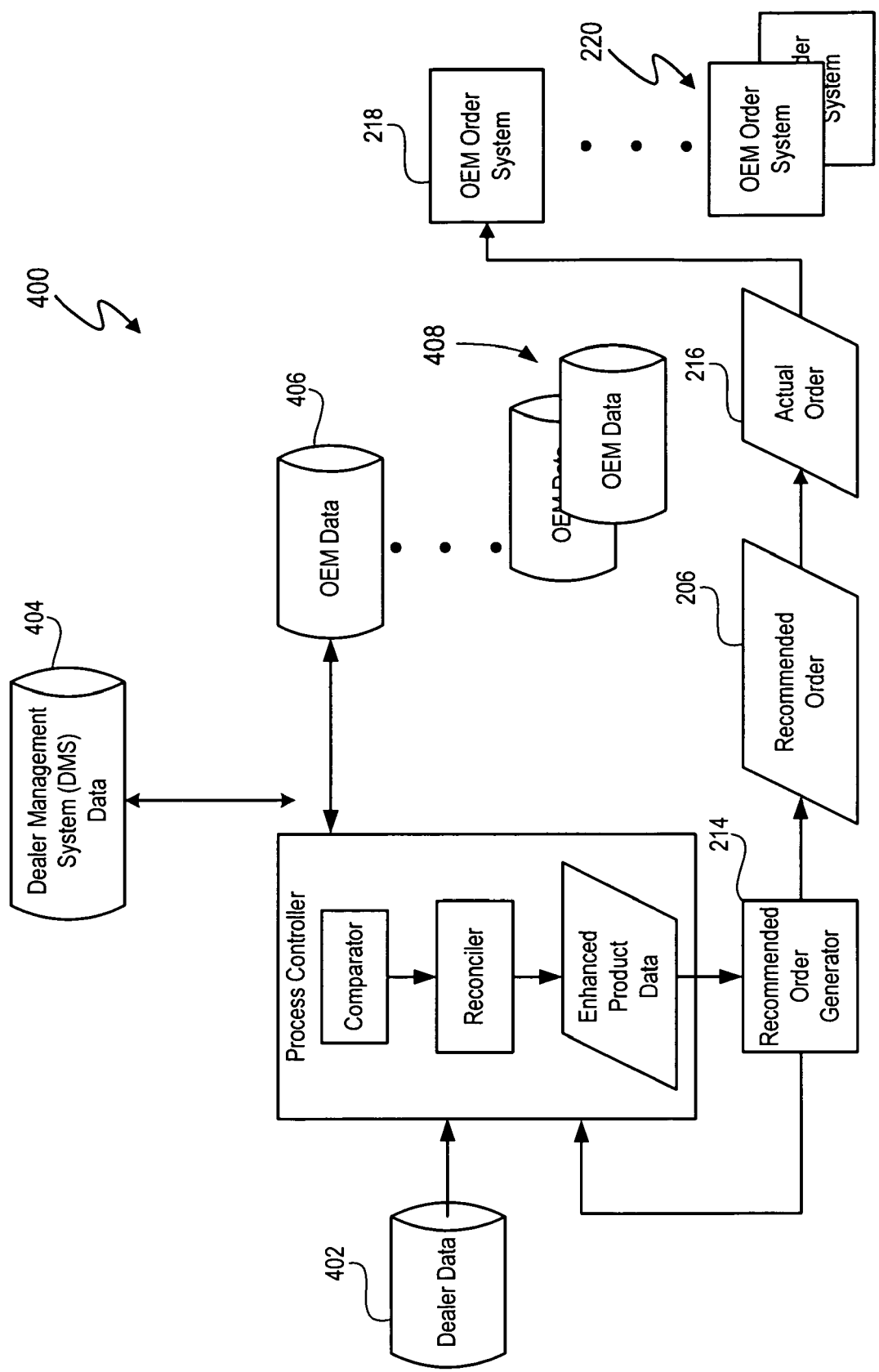
FIG. 4 depicts an automotive inventory, disposition, and order management system.

In at least one embodiment, the inventory, disposition, and order management system 200 is utilized in an automotive dealership context. FIG. 4 depicts an automotive inventory, disposition, and order management system 400. Unless otherwise indicated, an automotive dealership represents a single dealership or a collection of dealerships dealing in one or more vehicle makes. In the automotive context, the data sources include dealer data 402, dealer management system (DMS) data 404, and OEM data 406. The dealer data 402 includes dealer preferences, such as configuration and volume preferences. For example, dealer data 402 may indicate that a dealer wants X number of vehicle model 1, Y number of vehicle model 2, Z number of vehicle model 3, and so on, where X, Y, and Z are positive integers. The dealer data 402 may also specify a breakdown of trims for each model. For example, M % of vehicle model 1's have trim A, N % of vehicle model 1's have trim B, and so on. The dealer data 402 may also specify a breakdown of other features, such as all vehicle model 2's have a DVD entertainment package.

The DMS data 404 includes product disposition history and current inventory data. The product disposition history indicates how the vehicle has been transferred from the dealer to another entity. For example, product disposition history can reflect whether a product has been sold, traded, leased, or donated. Product disposition history can also include data associated with the disposition of the product such as one or more of the following data items:

Product Identifier (e.g. a vehicle identification number (VIN)), dealership identifier code, location of the vehicle (e.g. address), product receipt date, sale date, trade date, cost, sale price, age in inventory, reversal date (e.g. sale cancelled), sale type (e.g. retail, fleet, trade, or lease), customer identifier, salesperson, and profit.

The OEM data 406 includes product configuration and order status data. Automotive inventory, disposition, and order management system 400 can process data from one OEM or data from multiple OEMs as indicated by OEM data 408. A configurable product, such as a vehicle, is configured with a variety of features that together define the product. The features each have an attribute that is selected from one or more attributes. The features and attribute values associated with product define, in at least one embodiment, the product configuration data. For an automobile, features can include, for example, trim, option packages, wheels, audio components, transmission, engine, roof, interior color, interior fabric, exterior color, etc. Each feature has a particular attribute selected from a group of attributes, such as V8 engine, red exterior color, 16 inch alloy wheels, etc. Product configuration data generally resides with the OEM. Detailed configuration data can allow the dealer to take into consideration attribute values of configurable features when placing an order.

OEM's generally have complete product configuration data, i.e. data indicating the features available on a product and the attribute values of the features. OEMs also generally have product order status data that indicates a history and/or current status of a product from an initial order until the product leaves the OEM. In other words, the OEM has manufacturing pipeline data.

In at least one embodiment, automotive inventory, disposition, and order management system 400 operates in accordance with inventory, disposition, and order management process 300 to, for example, determine enhanced product data 204, recommended order 206, and actual order 216.

Many embodiments of the present invention have application to a wide range of industries and products including the following: computer hardware and software manufacturing and sales, professional services, financial services, automotive sales and manufacturing, telecommunications sales and manufacturing, medical and pharmaceutical sales and manufacturing, and construction industries.

Figure 5:
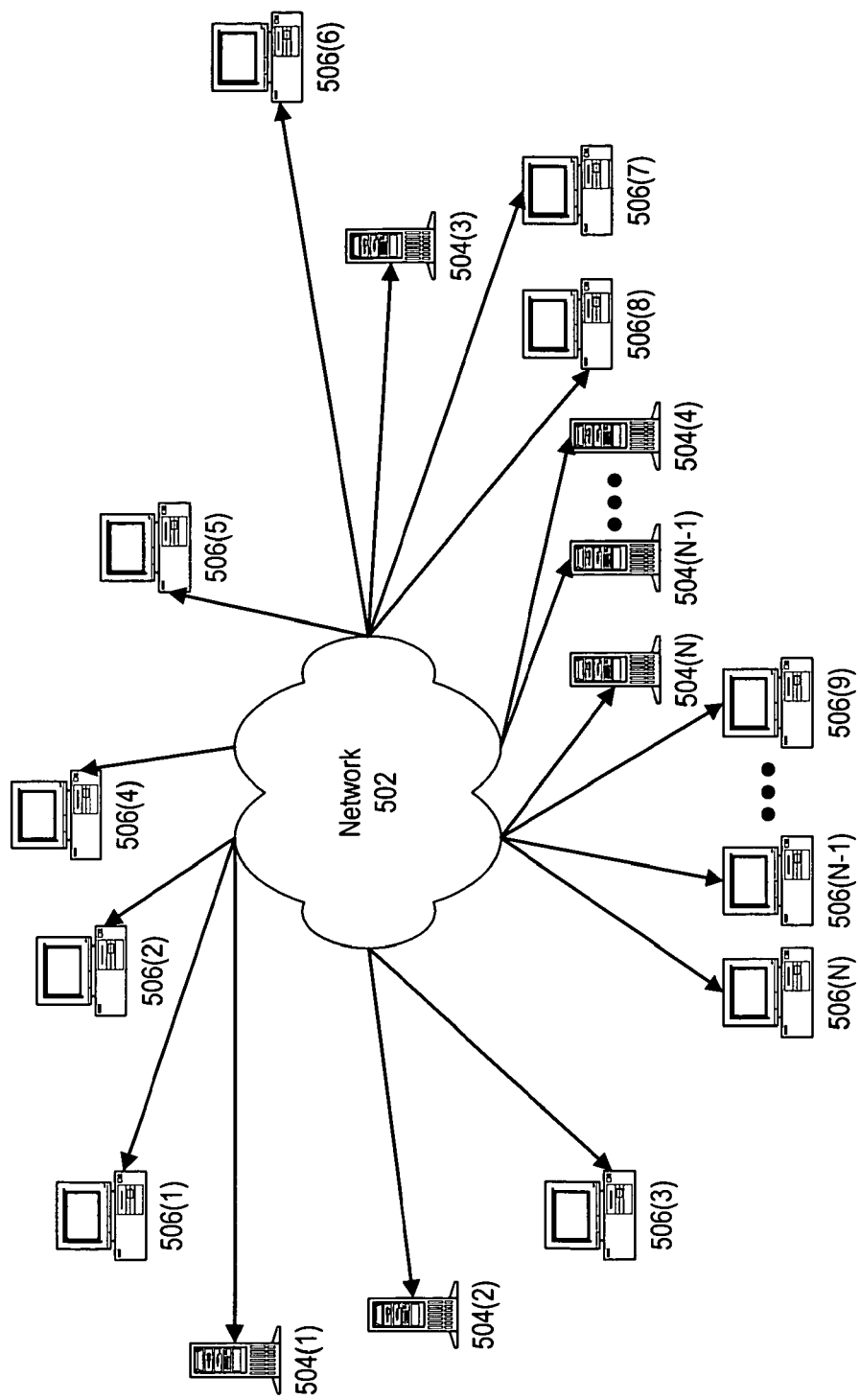
FIG. 5 depicts a network environment.

FIG. 5 depicts a block diagram illustrating a network environment in which an inventory, disposition, and order management system 200 and inventory, disposition, and order management process 300 may be practiced. Network 502 (e.g. a private wide area network (WAN) or the Internet) includes a number of networked server computer systems 504(1)-(N) that are accessible by client computer systems 506(1)-(N), where N is the number of server computer systems connected to the network. Communication between client computer systems 506(1)-(N) and server computer systems 504(1)-(N) typically occurs over a network, such as a public switched telephone network over asynchronous digital subscriber line (ADSL) telephone lines or high-bandwidth trunks, for example communications channels providing T1 or OC3 service. Client computer systems 506(1)-(N) typically access server computer systems 504(1)-(N) through a service provider, such as an internet service provider ("ISP") by executing application specific software, commonly referred to as a browser, on one of client computer systems 506(1)-(N).

Client computer systems 506(1)-(N) and/or server computer systems 504(1)-(N) may be, for example, computer systems of any appropriate design, including a mainframe, a mini-computer, a personal computer system including notebook computers, a wireless, mobile computing device (including personal digital assistants). These computer systems are typically information handling systems, which are designed to provide computing power to one or more users, either locally or remotely. Such a computer system may also include one or a plurality of input/output ("I/O") devices coupled to the system processor to perform specialized functions. Mass storage devices such as hard disks, compact disk ("CD") drives, digital versatile disk ("DVD") drives, and magneto-optical drives may also be provided, either as an integrated or peripheral device. One such example computer system is shown in detail in FIG. 6.

Figure 6:
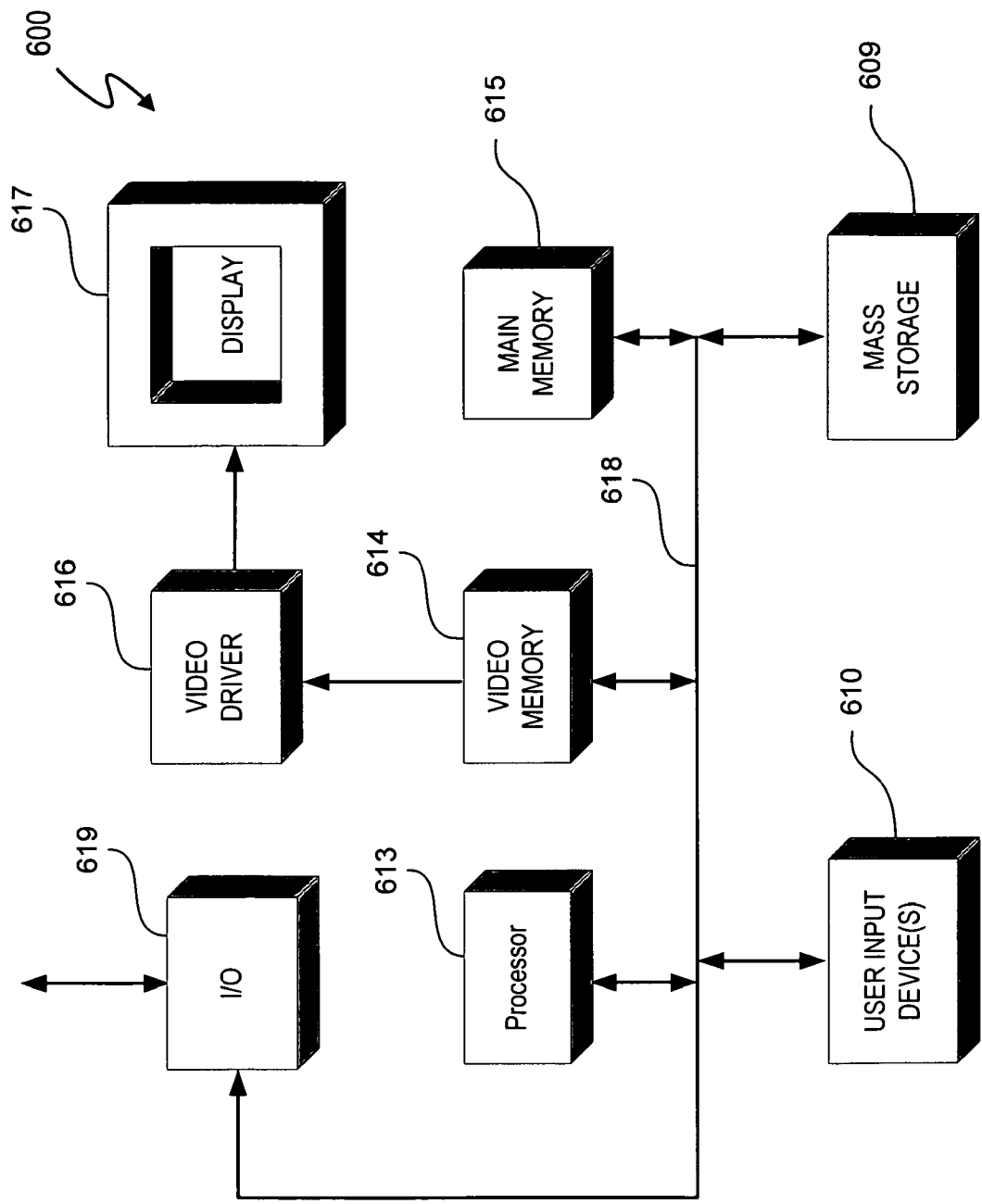
FIG. 6 depicts a computer system.

Embodiments of the inventory, disposition, and order management system 200 and inventory, disposition, and order management process 300 can be implemented on a computer system such as a general-purpose computer 600 illustrated in FIG. 6. For example, inventory, disposition, and order management process 300 can be implemented as software. Input user device(s) 610, such as a keyboard and/or mouse, are coupled to a bi-directional system bus 618. The input user device(s) 610 are for introducing user input to the computer system and communicating that user input to processor 613. The computer system of FIG. 6 generally also includes a video memory 614, main memory 615 and mass storage 609, all coupled to bi-directional system bus 618 along with input user device(s) 610 and processor 613. The mass storage 609 may include both fixed and removable media, such as other available mass storage technology. Bus 618 may contain, for example, 32 address lines for addressing video memory 614 or main memory 615. The system bus 618 also includes, for example, an n-bit data bus for transferring DATA between and among the components, such as CPU 609, main memory 615, video memory 614 and mass storage 609, where "n" is, for example, 32 or 64. Alternatively, multiplex data/address lines may be used instead of separate data and address lines.

I/O device(s) 619 may provide connections to peripheral devices, such as a printer, and may also provide a direct connection to a remote server computer system via a telephone link or to the Internet via an ISP. I/O device(s) 619 may also include a network interface device to provide a direct connection to a remote server computer system via a direct network link to the Internet via a POP (point of presence). Such connection may be made using, for example, wireless techniques, including digital cellular telephone connection, Cellular Digital Packet Data (CDPD) connection, digital satellite data connection or the like. Examples of I/O devices include modems, sound and video devices, and specialized communication devices such as the aforementioned network interface.

Computer programs and data are generally stored as instructions and data in mass storage 609 until loaded into main memory 615 for execution. Computer programs may also be in the form of electronic signals modulated in accordance with the computer program and data communication technology when transferred via a network. The method and functions relating to inventory, disposition, and order management system 200 and inventory, disposition, and order management process 300 may be implemented in a computer program alone or in conjunction with hardware, such as application specific hardware.

The processor 613, in one embodiment, is a microprocessor manufactured by Motorola Inc. of Illinois, Intel Corporation of California, or Advanced Micro Devices of California. However, any other suitable single or multiple microprocessors or microcomputers may be utilized. Main memory 615 is comprised of dynamic random access memory (DRAM). Video memory 614 is a dual-ported video random access memory. One port of the video memory 614 is coupled to video amplifier 616. The video amplifier 616 is used to drive the display 617. Video amplifier 616 is well known in the art and may be implemented by any suitable means. This circuitry converts pixel DATA stored in video memory 614 to a raster signal suitable for use by display 617. Display 617 is a type of monitor suitable for displaying graphic images.

The computer system described above is for purposes of example only. The inventory, disposition, and order management system 200 and inventory, disposition, and order management process 300 may be implemented in any type of computer system or programming or processing environment. It is contemplated that the inventory, disposition, and order management system 200 and inventory, disposition, and order management process 300 might be run on a stand-alone computer system, such as the one described above. The inventory, disposition, and order management system 200 and inventory, disposition, and order management process 300 might also be run from a server computer systems system that can be accessed by a plurality of client computer systems interconnected over an intranet network. Finally, the inventory, disposition, and order management system 200 and inventory, disposition, and order management process 300 may be run from a server computer system that is accessible to clients over the Internet.

Although the present invention has been described in detail, it should be understood that various changes, substitutions and alterations can be made hereto without departing from the spirit and scope of the invention as defined by the appended claims.

What is claimed is:

1. A method of obtaining access to enhanced product data via access of multiple data sources and determination of accurate product inventory in a supply chain, the method comprising: executing first instructions in a first computer system, wherein the first computer system includes a first processor coupled to a first memory, and the first memory includes the first instructions that are executable by the first processor to transform the first computer system into a system performing: obtaining the enhanced product data, wherein the enhanced product data is obtained by a second computer system that includes a second processor coupled to a second memory, and the second memory includes second instructions that are executable by the second processor to perform operations comprising: accessing the multiple data sources to obtain complementary and augmented product data for a plurality of products in the supply chain, wherein the product data includes product identification data, product inventory data, and product configuration data, and the multiple data sources comprise data sources that are remotely located from each other in separate databases, the complementary product data comprises data that fills in data gaps in sets of data for the plurality of products, and the augmented data comprises data that provides details related to the plurality of products; transforming the complementary and augmented product data into a form for automated processing; performing an audit of the transformed complementary and augmented product data using rules that define expected values for types of data, wherein the rules are tailored to the types of data to reflect the type of expected values; for each product of a plurality of products, comparing the transformed and audited product data obtained from the multiple data sources; and reconciling any discrepancies in the transformed, audited, and compared complementary and augmented product data to determine enhanced product data for the plurality of products; and making the enhanced product data available to the first computer system.

2. The method of claim 1 wherein at least one of the data sources is a manufacturer of at least one of the products and one of the data sources is a dealer of at least one of the products.

3. The method of claim 1, wherein the data sources comprise multiple manufacturers of respective products.

4. The method of claim 1 wherein the products are selected from a group consisting of vehicles and computer systems.

5. The method of claim 1 wherein the product configuration data includes product feature attributes.

6. The method of claim 1 further comprising: consolidating the complementary and augmented product data generate consolidated product data; and determining a recommended order for additional products based at least in part on the consolidated product data.

7. The method of claim 1, further comprising: determining a recommended order for additional products based at least in part on the complementary and augmented product data.

8. The method of claim 7 wherein determining a recommended order further comprises: providing an order based upon the recommended order to at least one manufacturer;

receiving feedback from the manufacturer if the order includes flawed data; adjusting the order if the order includes flawed data to generate an adjusted order; and providing the adjusted order to the manufacturer if the order includes flawed data.

9. The method of claim 7 further comprising: comparing the recommended order to future complementary and augmented product data and goals of the recommended order to generate order adjustment information; and utilizing the order adjustment information to determine future recommended orders.

10. The method of claim 1 wherein the complementary and augmented product data provides an accurate history of a product from manufacture through disposition from a dealer to a third party.

11. The method of claim 1 wherein at least one of the data sources further includes product dealer configuration preferences.

12. The method of claim 1 wherein reconciling any discrepancies in the product data to determine complementary and augmented product data further comprises: auditing the product data utilizing metrics to determine accuracy of the product data obtained from the multiple data sources.

13. The method of claim 12 wherein the metrics include rules to which product data conforms when the product data is accurate.

* * * * *